United States Patent [19]

Okazaki et al.

[11] Patent Number: 4,920,825

[45] Date of Patent: May 1, 1990

[54] VEHICLE ENGINE

[75] Inventors: Kouji Okazaki; Tsugio Ikeda; Takashi Inagaki, all of Saitama, Japan

[73] Assignee: Honda Giken Kabushiki Kaisha, Tokyo, Japan

[21] Appl. No.: 164,416

[22] Filed: Mar. 4, 1988

[30] Foreign Application Priority Data

Mar. 6, 1987 [JP] Japan .................................. 62-51376
Mar. 6, 1987 [JP] Japan ........................... 62-32926[U]

[51] Int. Cl.$^5$ .......................................... F16H 57/02
[52] U.S. Cl. .................................. 74/606 R; 180/219; 123/195 C
[58] Field of Search ............. 74/606 R; 180/219, 227, 180/226, 230, 228, 231, 205, 206, 207; 474/144, 146; 123/195 R, 195 C

[56] References Cited

U.S. PATENT DOCUMENTS

| | | | |
|---|---|---|---|
| 4,463,823 | 8/1984 | Tsuboi | 180/226 |
| 4,468,979 | 9/1984 | Inagaki et al. | 74/606 R |
| 4,606,310 | 8/1986 | Makino | 123/195 C X |
| 4,666,015 | 5/1987 | Matsuda et al. | 74/606 R |
| 4,723,619 | 2/1988 | Yamamoto et al. | 180/219 |

FOREIGN PATENT DOCUMENTS

| | | | |
|---|---|---|---|
| 0027250 | 2/1979 | Japan | 74/606 R |
| 0094169 | 6/1982 | Japan | 74/606 R |
| 0054233 | 3/1983 | Japan | 74/606 R |
| 0069251 | 4/1985 | Japan | 74/606 R |
| 0223370 | 10/1986 | Japan | 74/606 R |

Primary Examiner—Vinh T. Luong
Attorney, Agent, or Firm—Lyon & Lyon

[57] ABSTRACT

A vehicle engine, particularly adapted for motorcycle application, includes a housing structure in which the cylinder block, the crankcase and the transmission case are integrally formed and openings are provided in separate, angularly displaced walls of the housing for accessing the crankcase and transmission case respectively to permit the crankshaft and the transmission to be independently installed or demounted with respect to each other. Also, the detachable cover for closing one of the side openings of the housing is formed as a stopper for preventing axial disengagement of the starter apparatus ring gear from the crankcase.

8 Claims, 16 Drawing Sheets

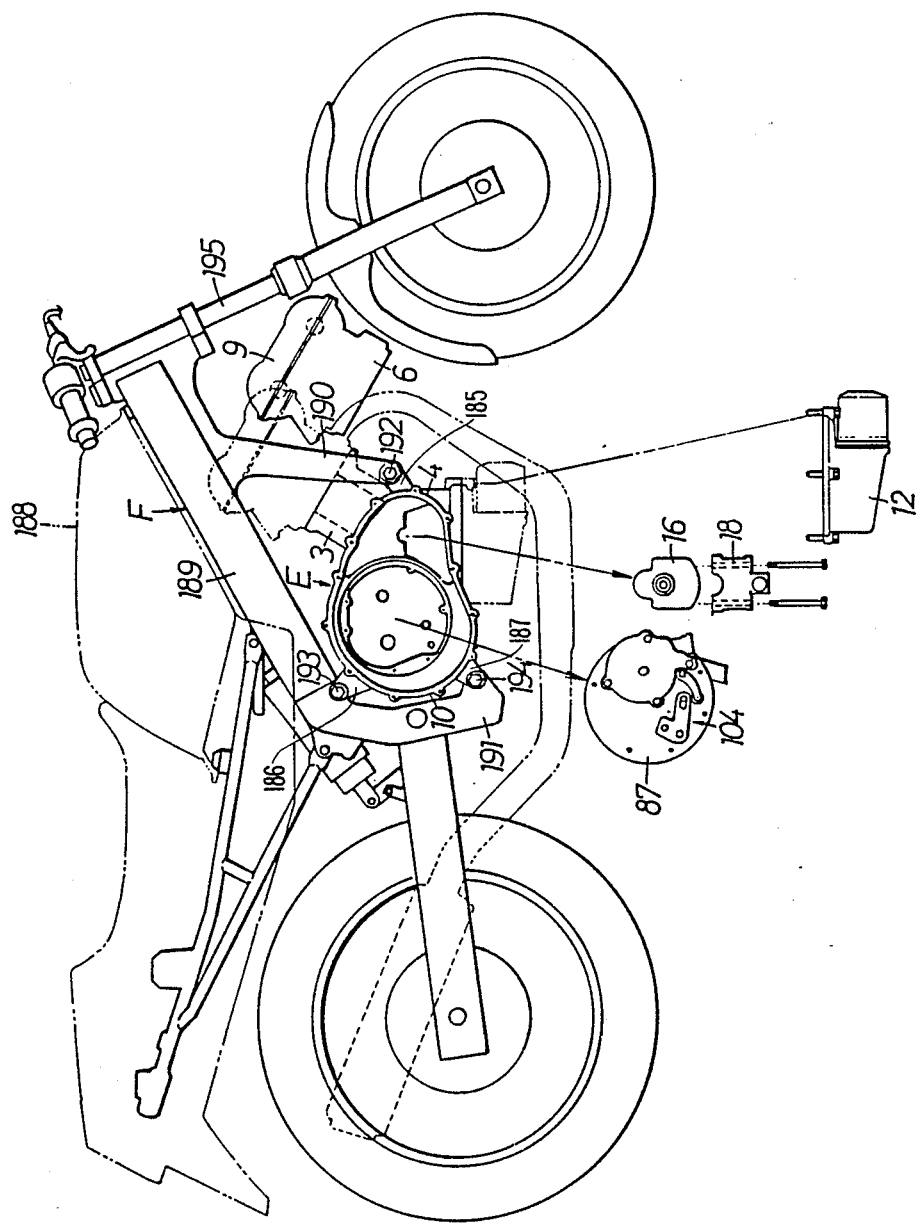

VEHICLE ENGINE

BACKGROUND OF THE INVENTION

The present invention relates to an engine for mounting on a vehicle, primarily a motorcycle or a motor tricycle, and more particularly, to an improvement in the engine casing structure in which the crankcase for housing the crankshaft and the transmission case for housing the vehicle's transmission are formed as an integrated structure.

In such engines of conventional construction, such as, for example, that described in Japanese Utility Model Laid-Open Publication No. 54-27250, a lower opening for permitting the crankshaft and the transmission to be mounted and demounted is formed through the lower end surface of the transmission case and the oil pan is connected to this lower end surface. When the crankshaft is intended to be removed from the crankcase, the transmission must first be removed, causing an impedance in vehicle maintainability.

If, on the other hand, the lower opening of the transmission case in these prior art engines is expanded to a lower end surface of the crankcase so as to provide sufficient space to permit the crankshaft to be removed without interfering with the transmission, the rigidity of the crankcase and the transmission case is disadvantageously reduced.

Also, as best exemplified in Japanese Patent Application No. 58-54233, such prior art engine organizations, in which the engine starting device includes a ring gear driven by a starting motor, that is rotatably supported on the crankshaft and connected thereto by an overrunning clutch, require a stopper member secured to the crankshaft by a bolt, or the like, for preventing detachment of the ring gear from the crankshaft. Such stopper members and fasteners have heretofore been dedicated members that are characterized by a complicated construction.

It is to the amerlioration of these problems, therefore, that the present invention is directed.

SUMMARY OF THE INVENTION

Accordingly, it is an object of the present invention to provide a vehicle engine having a structure such that the installation and removal of the crankshaft with respect to the crankcase can be carried out without interference with the installation and removal of the transmission with respect to the transmission case, and in which the rigidity of the crankcase and the transmission case can be maintained.

The invention additionally contemplates an alternative embodiment by means of which the above-mentioned advantages are further enhanced in that independent installation and removal of the crankshaft with the connecting rods and pistons attached thereto can be achieved.

The above object is achieved by the improvement comprising a lower opening in the engine casing structure for permitting the crankshaft to be mounted and demounted therethrough, the lower opening extending through a lower end surface of the crankcase, which surface is set at a vertical position between the first side opening of the crankcase and the lowermost surface of the transmission case. An oil pan is connected to the lower end surface of the crankcase and a second side cover is adapted to be connected to one side wall of the transmission case. A second side opening is provided in the transmission case for permitting the transmission to be mounted and demounted therethrough, the second side opening being formed through the one side wall of the transmission case and being adapted to be closed by the second side cover.

In the described engine organization the crankshaft is mounted into and demounted from the crankcase through the lower opening, while the transmission is mounted into and demounted from the transmission case through the right opening. Thus, the mounting and demounting work of the crankshaft can be carried out independently of the mounting and demounting work of the transmission. Further, as the lower opening and the right opening are not located at the same surface of the crankcase and the transmission case the rigidity of the crankcase and the transmission case is advantageously ensured.

Further, since the lower end surface of the crankcase is located below both the side openings of the crankcase, the connecting surfaces between the crankcase and the side covers do not intersect the connecting surface between the crankcase and the oil pan, thereby effecting the reliable sealing of each connecting surface.

Also, since the lower end surface of the crankcase is located above the lowermost surface of the transmission case, the depth of the crankcase is accordingly reduced, thereby effecting the easy maintenance of the crankshaft from the lower opening. At the same time, the depth of the oil pan may be increased without adversely affecting road clearance.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 14 an exploded side view of the engine organization of FIG. 1 shown mounted on a vehicle;

DESCRIPTION OF THE PREFERRED EMBODIMENTS OF THE INVENTION

Figure 1:
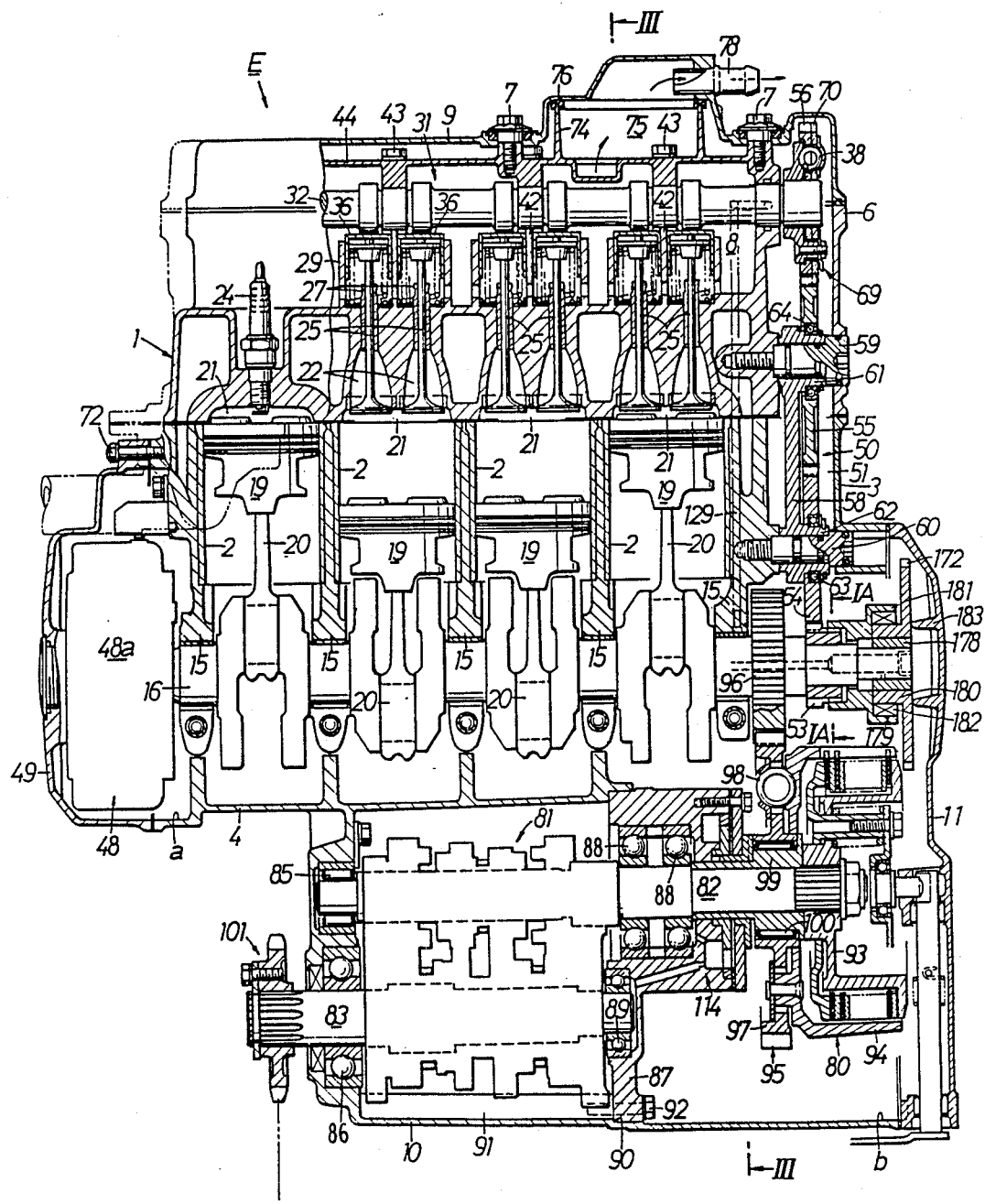
FIG. 1 is a rear elevational view, partly in section taken along line I—I of FIG. 3, illustrating an engine organization incorporating the present invention.
Figure 2:
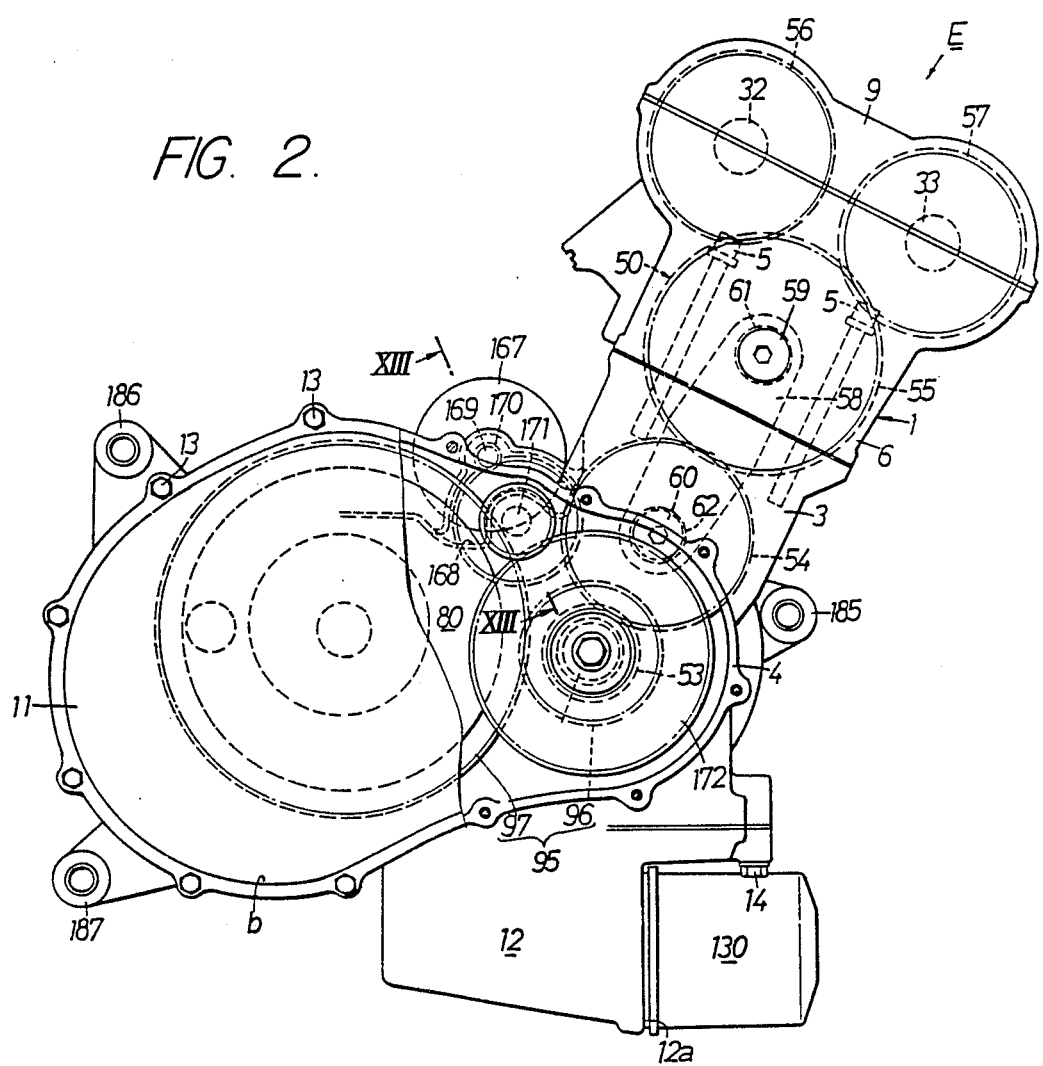
FIG. 2 is a right side view of FIG. 1.
Figure 3:
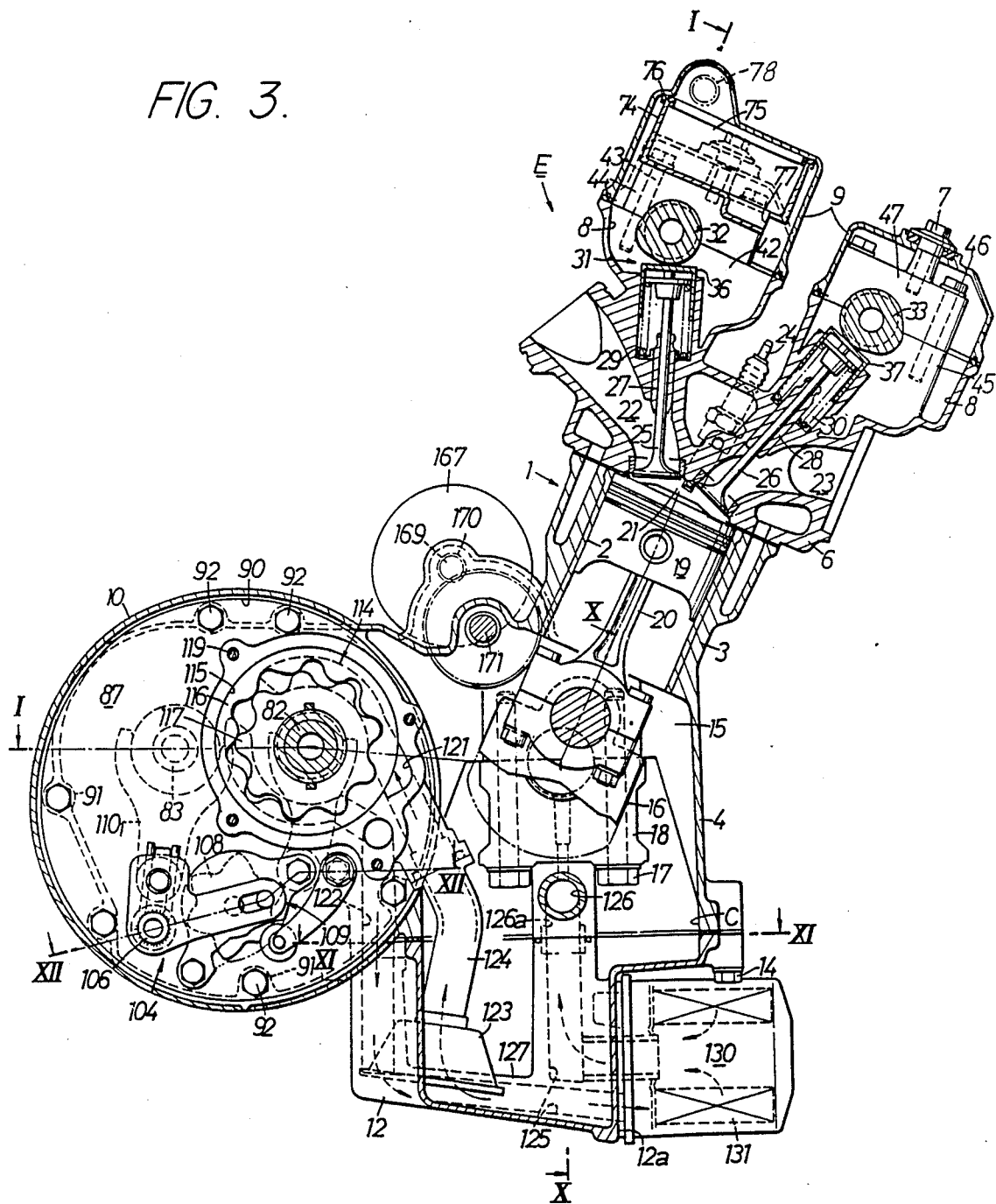
FIG. 3 is a sectional view taken along line III—III of FIG. 1.
Figure 4:
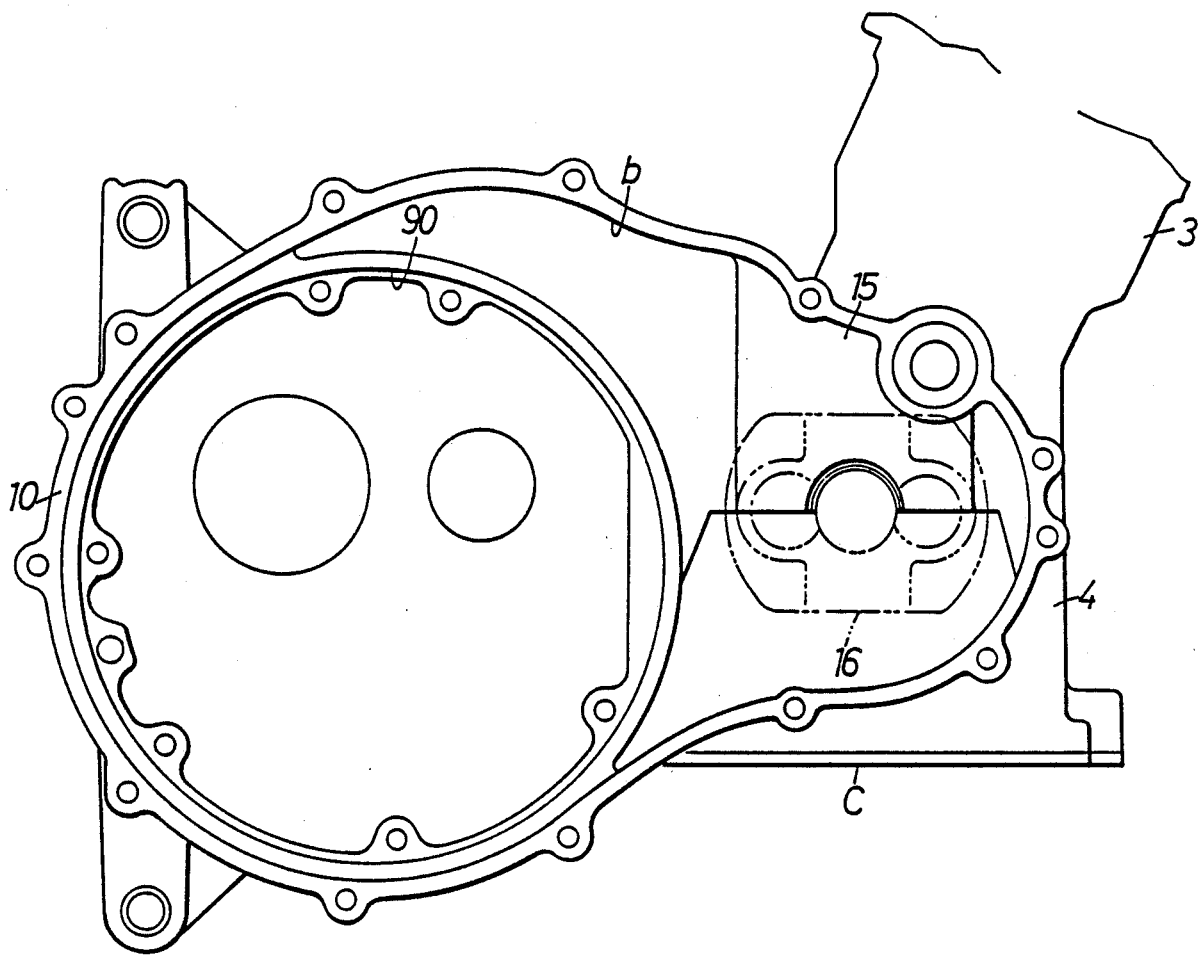
FIG. 4 is a right side view of the crankcase of the engine organization of FIG. 1.
Figure 5:
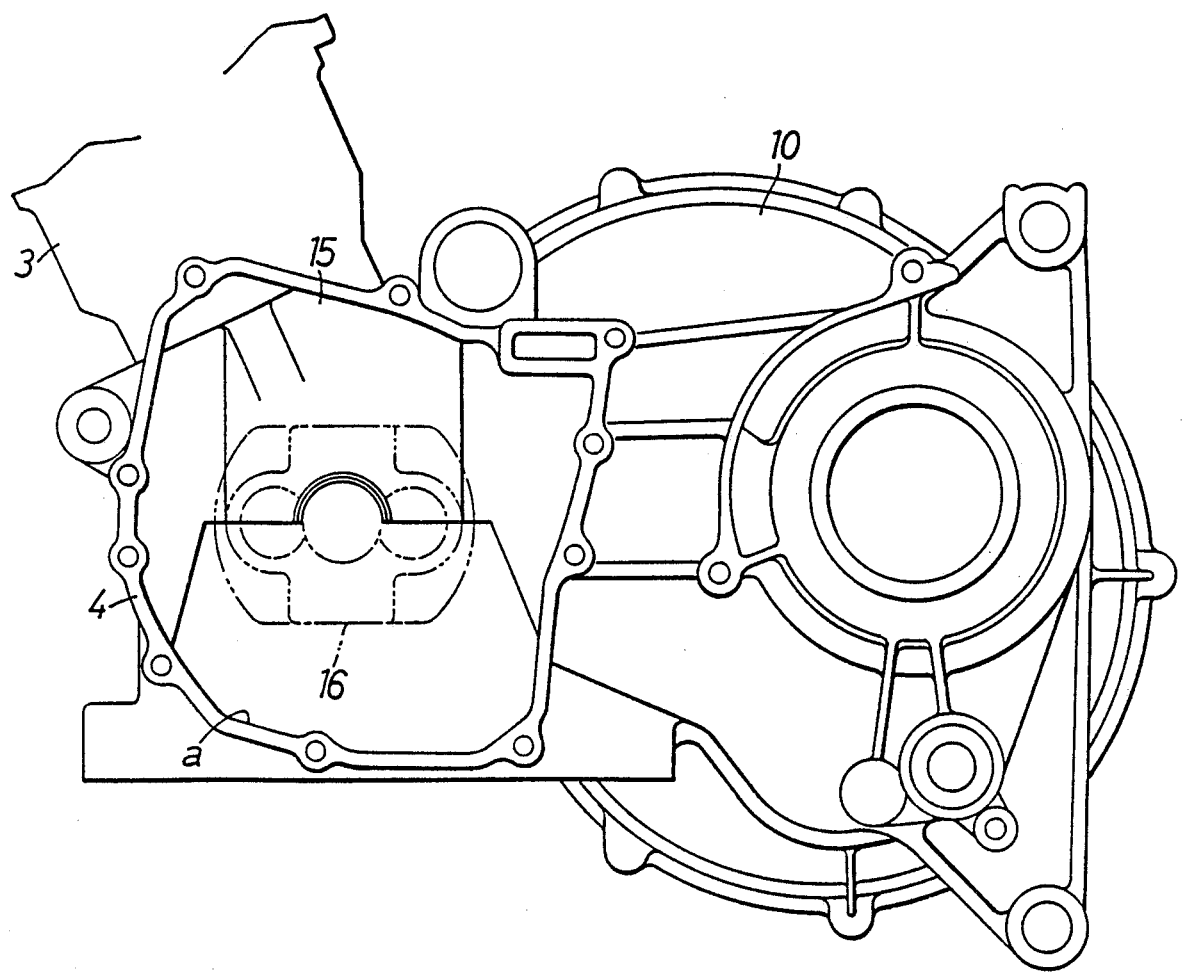
FIG. 5 is a left side view of the crankcase of the engine organization of FIG. 1.

Referring first to FIGS. 1 to 3, reference symbol E designates an engine for a motorcycle. In the following description, the terms of "front", "rear", "right" and "left" are used with respect to the vehicle.

An engine body 1 of the engine E is primarily composed of a cylinder block 3 having four cylinders 2 arranged in line transversely of the vehicle and inclined to the front thereof, a crankcase 4 integrally continuing from the lower end of the cylinder block 3, a cylinder head 6 superimposed on the upper end surface of the cylinder block 3 and fixed thereto by means of bolts 5, a head cover 9 superimposed on the upper end surface of the cylinder head 6 and fixed to a cam holder 47, to be hereinafter described, by means of bolts 7 whereby a valve operating chamber 8 is defined between the head cover 9 and the cylinder head 6, and a transmission case 10 integrally continuing from the rear portion of the crankcase 4. The cylinder block 3, the crankcase 4 and the transmission case 10 are integrally formed by a single casting.

The crankcase 4 is formed at its left wall with a left opening a for permitting a generator 48, which will be hereinafter described, to be attached to or detached from the left end portion of a crankshaft 16. Further, the crankcase 4 and the transmission case 10 are formed at their respective right walls with a common right opening b for permitting a ring gear 172 and an overrunning clutch 179, both of which will be hereinafter described, to be attached to or detached from the right end portion of the crankshaft 16 and for permitting a transmission 81, which will be hereinafter described, to be attached to or detached from the transmission case 10. Further, the crankcase 4 is formed at its lower end surface with a lower opening c (FIG. 3) for permitting the crankshaft 16 to be attached to or detached from the crankcase 4.

A left side cover 49 for closing the left opening a is detachably connected to the crankcase 4 by means of bolts 72, and a right side cover 11 for closing the right opening b is similarly connected to the crankcase 4 and the transmission case 10 by means of bolts 13. Further, an oil pan 12 for closing the lower opening c is fixed to the crankcase 4 by means of bolts 14.

The crankcase 4 has a top wall integrally formed with crank journal supporting walls 15 perpendicularly continuing from partition walls of the cylinders 2 and outside walls of the end cylinders 2. The crankshaft 16 to be received in the crankcase 4 is rotatably held by the crank journal supporting walls 15 and an integral crank holder 18 to be fixed to the lower ends of the crank journal supporting walls 15 by means of bolts 17. The crankshaft 16 is connected through connecting rods 20 to pistons 19 slidably engaged in the cylinders 2.

Figure 6:
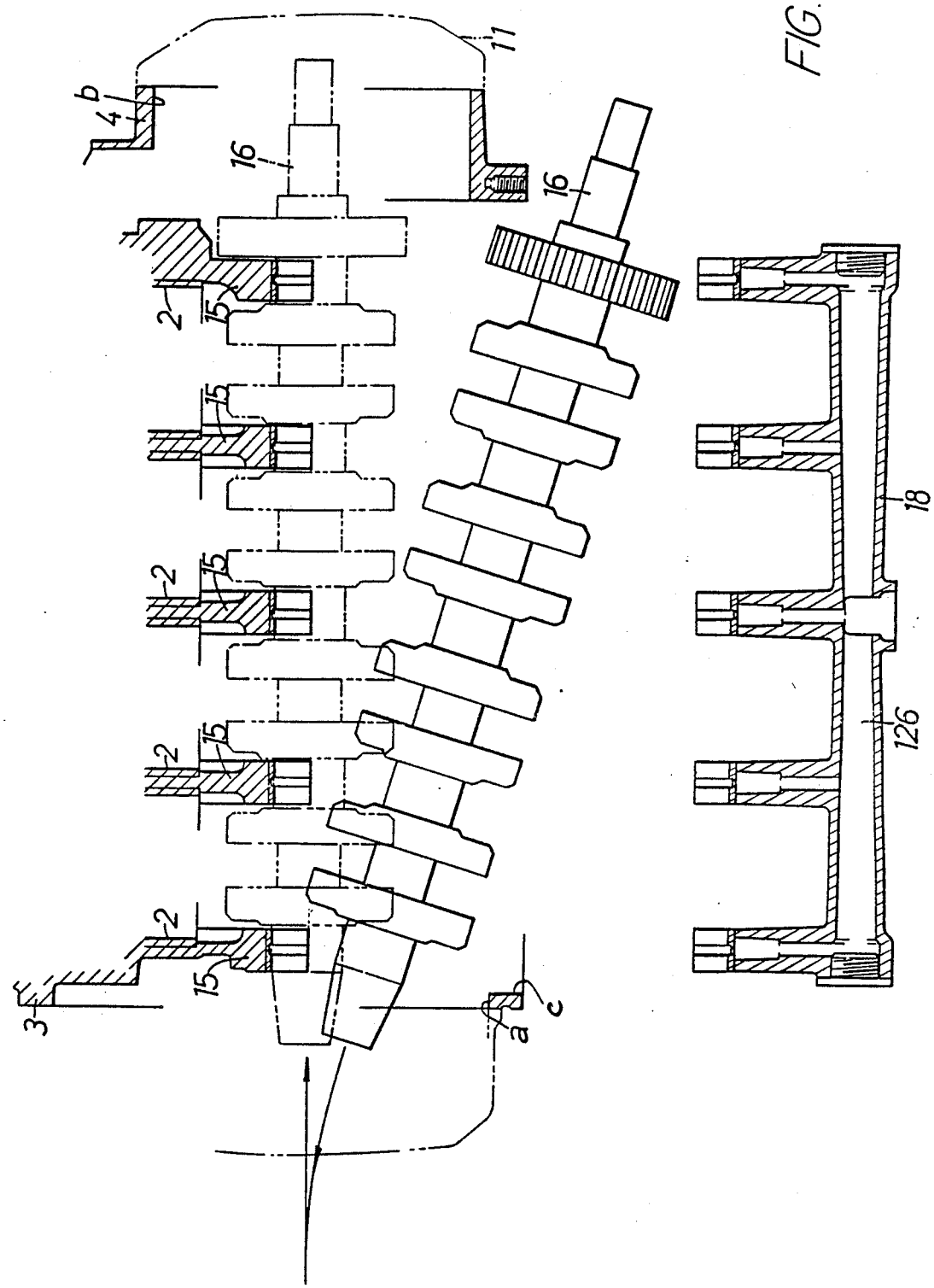
FIG. 6 is a view illustrating the manner in which the crankshaft can be installed in the crankcase.
Figure 7:
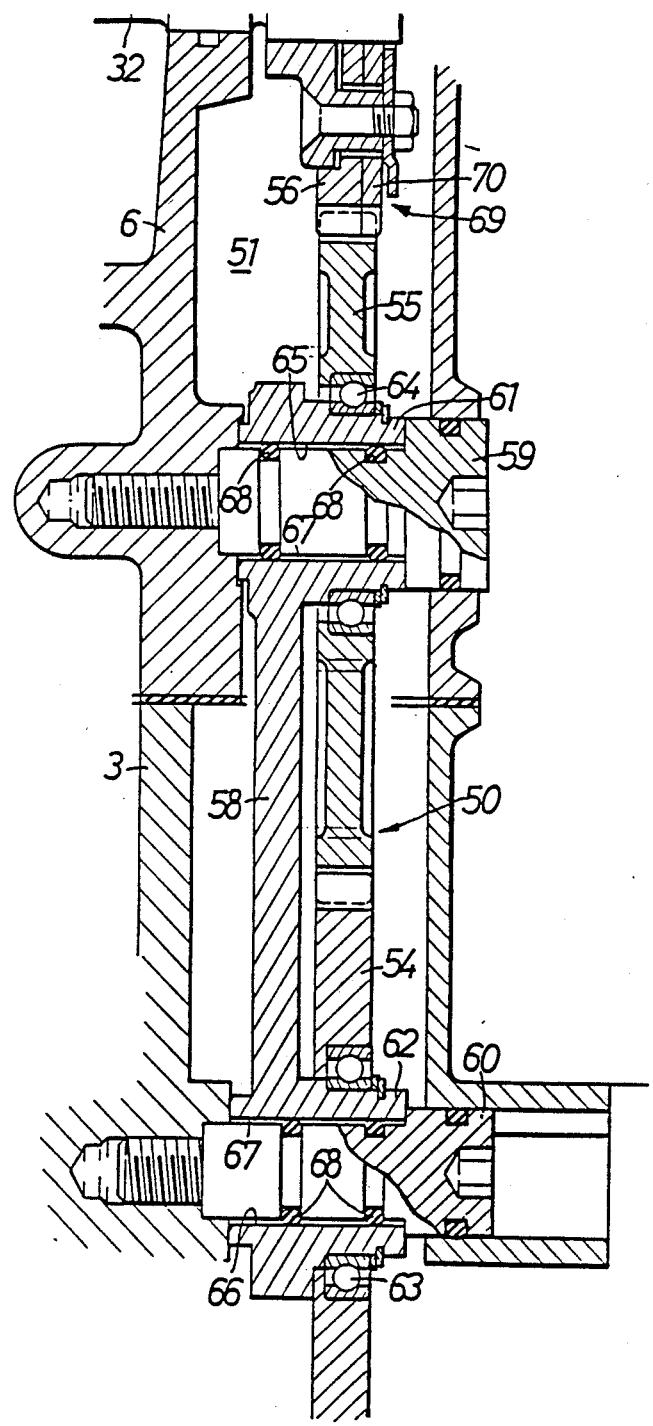
FIG. 7 is an enlarged view of the timing gear shown in FIG. 1.
Figure 8:
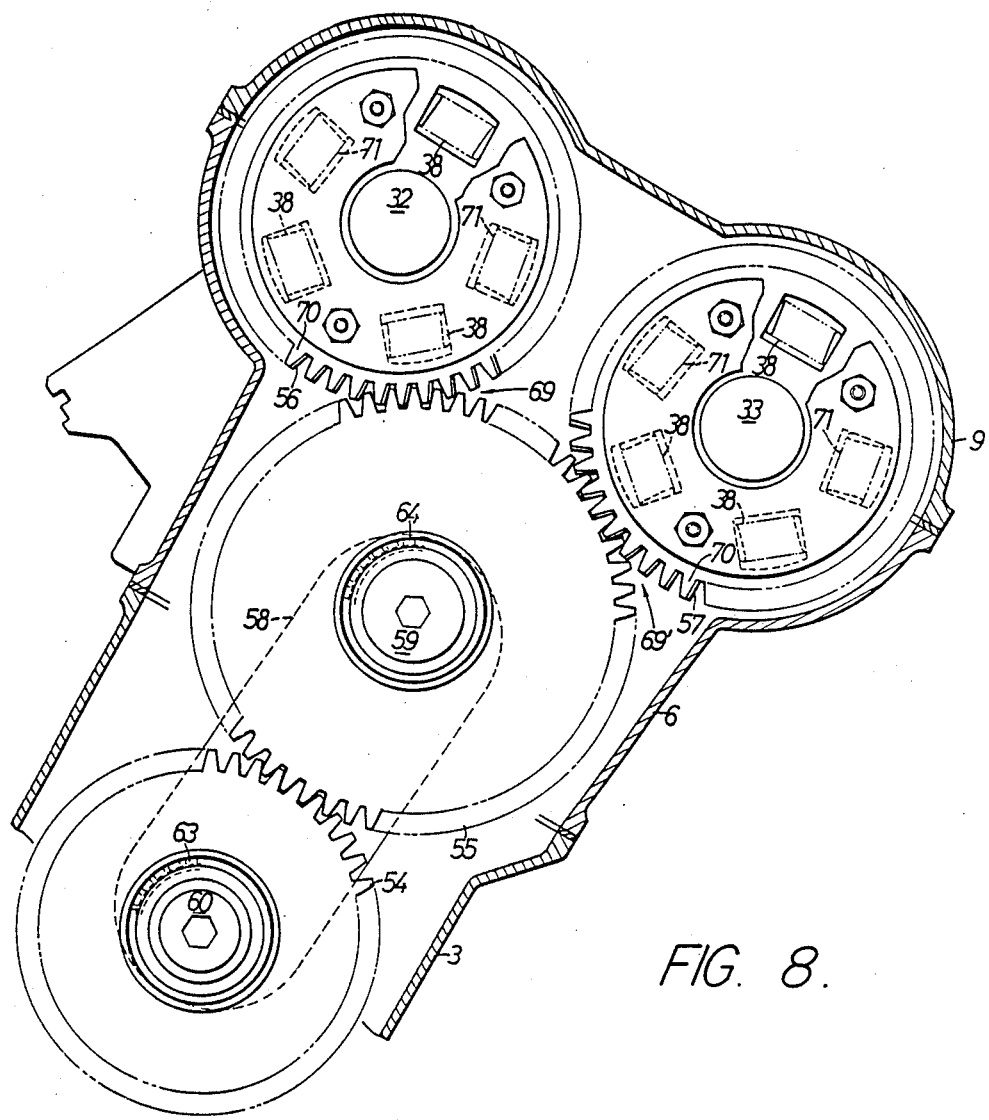
FIG. 8 is a side view of the structure shown in FIG. 7.

The lower end of the crankcase 4 extends downward from the left opening a and the right opening b to a position higher than the lowermost surface of the transmission case 10. The lower opening c has a transverse width shorter than the entire length of the crankshaft 16 for the purpose of making the crankcase 4 compact. However, since the left side wall and the right side wall of the crankcase 4 have the openings a and b, as mentioned above, the crankshaft 16 may be simply mounted into and demounted out of the crankcase 4. In mounting the crankshaft 16 into the crankcase 4, as shown in FIG. 6, the left end or the right end of the crankshaft 16 is inserted into the lower opening c under an inclined condition of the crankshaft 16. Then, the left end or the right end of the crankshaft 16 is projected outwardly from the left opening a or the right opening b to restore a horizontal condition of the crankshaft 16. Next, the crankshaft 16 is set in a fixed position where the same bears against the crank journal supporting walls 15. Thereafter, the crank holders 18 are inserted through the lower opening c, and mounted to the crankshaft 16. In demounting the crankshaft 16, the manner is reversed to the above.

In the preferred embodiment as illustrated, the crankshaft 16 may be inserted and removed from the left opening a. In this manner, the crankshaft 16 is mounted into and demounted from the crankcase 4 through the lower opening c, while the transmission 81 is mounted into and demounted from the transmission case 10 through the right opening b. Thus, the mounting and demounting work of the crankshaft 16 can be carried out independently of the mounting and demounting work of the transmission 81.

As the left opening a, the right opening b and the lower opening c are not located on the same surface of the crankcase 4 and the transmission case 10, the rigidity of the crankcase 4 and the transmission case 10 is relatively less reduced.

Further, since the lower end surface of the crankcase 4 is located below both the openings a and b, the connecting surfaces between the crankcase 4 and the side covers 49 and 11 do not intersect the connecting surface between the crankcase 4 and the oil pan 12, thereby enabling the reliable sealing of each connecting surface.

Further, since the lower end surface of the crankcase 4 is located above the lowermost surface of the transmission case 10, the depth of the crankcase 4 is accordingly reduced, thereby effecting easy maintenance of the crankshaft 16 from the lower opening c. At the same time, the depth of the oil pan 12 may be increased with a desired road clearance ensured, thereby increasing the capacity of the oil pan 12.

The lower surface of the cylinder head 6 is recessed to form combustion chambers 21 that communicate with the respective cylinders 2. The top surface of each combustion chamber 21 is formed like a pent roof having a crest line parallel to the crankshaft 16. A pair of intake ports 22 are arranged side by side along the crest line and have their respective inner ends opening to one of the slant surfaces forming the top surface of the combustion chamber 21. Similarly, a pair of exhaust ports 23 are arranged side by side along the crest line and have their respective inner ends opening to the other slant surface of the combustion chamber 21. The intake ports 22 have their respective outer ends opening to the rear surface of the cylinder head 6, and the exhaust ports 23 have their respective outer ends opening to the front surface of the cylinder head 6.

An ignition plug 24 in each combustion chamber 21 is so located as to be surrounded by the intake ports 22 and the exhaust ports 23, and is threadedly engaged with the cylinder head 6.

An intake valve 25 and an exhaust valve 26 for opening and closing each intake port 22 and each exhaust port 23, respectively, are guided by valve guides 27 and 28 fixed to the cylinder head 6 in such a manner as to be liftably slid with respect to the valve guides 27 and 28, respectively. The intake and exhaust valves 25 and 26 are arranged in such a manner that they are upwardly divergent in extending toward their respective valve heads.

The intake and exhaust valves 25 and 26 are provided with valve springs 29 and 30 for biasing them in a valve closing direction. A valve operating device 31 for opening the intake and exhaust valves 25 and 26 against the biasing force of the valve springs 29 and 30 is provided in the valve operating chambers 8.

The valve operating device 31 comprises an intake camshaft 32 extending over the series of intake valves 25, an exhaust camshaft 33 extending over the series of exhaust valves 26, intake cam followers 36 slidably guided by the cylinder head 6 and interposed between the intake camshaft 32 and the heads of the intake valves 25, and exhaust cam followers 37 slidably guided by the cylinder head 6 and interposed between the exhaust camshaft 33 and the heads of the exhaust valves 26. The intake camshaft 32 is rotatably supported between a plurality of cam journal supporting walls 42 projecting upward from a bottom wall of the valve operating chamber 8 and an integral cam holder 44 fixed to the cam journal supporting walls 42 by means of bolts 43. Similarly, the exhaust camshaft 33 is supported between a plurality of cam journal supporting walls 45 projecting upward from a bottom wall of the valve operating chamber 8 and an integral cam holder 47 fixed to the cam journal supporting walls 45 by means of bolts 46. The intake and exhaust camshafts 32 and 33 are connected through a timing gear 50 to the crankshaft 16.

As shown in FIGS. 1, 2, 7 and 8, the timing gear 50 is accommodated in a continuous timing gear chamber 51 formed at the right end portions of the cylinder block 3, the cylinder head 6 and the head cover 9. The timing gear 50 comprises a drive gear 53 press-fitted with the right end portion of the crankshaft 16, a first idler gear 54 meshing with the drive gear 53, a second idler gear 55 meshing with the first idler gear 54, an intake driven gear 56 mounted through damper springs 38 to the right end portion of the intake camshaft 32 and meshing with the second idler gear 55, an exhaust driven gear 57 mounted through damper springs 38 to the right end portion of the exhaust camshaft 33, and a support plate 58 for supporting the first and second idler gears 54 and 55. Thus, the rotation of the crankshaft 16 is transmitted to both the camshafts 32 and 33 with a reduction ratio of $\frac{1}{2}$.

The support plate 58 is supported on a pair of upper and lower support shafts 59 and 60 threadedly engaged into the cylinder head 6 and the cylinder block 3, respectively. The support plate 58 is formed at its right surface with a pair of upper and lower bosses 61 and 62 projecting therefrom, and the first and second idler gears 54 and 55 are supported through ball bearings 63 and 64 to the upper and lower bosses 61 and 62. The support plate 58 is formed with shaft holes 65 and 66 for inserting the support shafts 59 and 60 thereinto, respectively, and there are defined fixed clearances 67 between the support shafts 59 and 60 and the shaft holes 65 and 66. Elastic O-rings 68 are mounted on the support shafts 59 and 60 so as to fill the fixed clearances 68. Accordingly, the support plate 58 is displaceable within the range of the clearance 67 by the deformation of the O-rings 68.

Although the upper boss 62 is aligned to the shaft hole 66 for the purpose of making the support plate 58 compact in the preferred embodiment shown, it is not always necessary to arrange the bosses 61 and 62 as mentioned above.

The support shafts 59 and 60 are supported at their end threaded portions by the inner wall of the timing gear chamber 51 and supported at their circular head portions by the outer wall of the chamber 51. Thus, the support shafts 59 and 60 are supported at both respective ends thereof.

A backlash eliminating mechanism 69 is provided between the intake driven gear 56 and the second idler gear 55, and similarly, a backlash eliminating mechanism 69' is provided between the exhaust driven gear 57 and the second idler gear 55. As both the mechanisms 69 and 69' are of the same structure, the backlash eliminating mechanisms 69 only will now be described.

The backlash eliminating mechanism 69 comprises, first, an auxiliary gear 70 located adjacent to the driven gear 56 to be relatively rotatable therewith, and meshing with the second idler gear 55, and, secondly, torsion springs 71 for applying a one-way torsional force between the adjacent gears 56 and 70. Accordingly, the teeth of the second idler gear 55 are resiliently engaged with the teeth of the driven gear 56 and the auxiliary gear 70 by the torsional force of the torsion springs 71, thereby eliminating the backlash at the meshing portion. At the same time, there is generated a component of force forcing the teeth of the second idler gear 55 outwardly toward the drive gear 53 at the engaged portion of the driven gear 56 and the auxiliary gear 70. Thus, the support plate 58 normally receives the component of force, as mentioned above, from both the backlash eliminating mechanisms 69 and 69' through the second idler gear 55.

The described engine body 1 is preferably formed of Al alloy, and the support plate 58, the drive gear 53, the idler gears 54 and 55 and the driven gears 56 and 57 are preferably formed of iron material.

During the operation of the engine E, the engine body 1 is thermally expanded more than the timing gear 50 owing to the difference in materials and the heat, causing an increase in the distances between the crankshaft 16 and the camshafts 32 and 33 and generating a backlash at the meshing portion between the drive gear 53 and the first idler gear 54. However, the support plate 58 deforms the O-rings 68 owing to the component of force, as mentioned above, and displaces the same to the drive gear 53 to urge the idler gear 54 to the drive gear 53. Therefore, the backlash between the gears 53 and 54 may be eliminated.

The first and second idler gear 54 and 55 and the support plate 58, being formed of iron material, have substantially the same coefficient of thermal expansion. Therefore, even when these members are thermally expanded, there is no possibility that a distortion in backlash between both the idler gears 54 and 55 will be generated.

Referring again to FIG. 1, a rotor 48a of a generator 48 is fixed to the left end portion of the crankshaft 16, and a stator is fixed to the side cover 49.

There will now be described the breather device. As shown in FIGS. 1 and 3, the upper surface of the cam holder 44 for the intake camshaft 32 is integrally formed with a surrounding wall 74 projecting upwardly therefrom in such a manner as to partially surround the cam holder 44, and the head cover 9 is mounted through a sealing member 76 on the upper end of the surrounding wall 74 to define a breather chamber 75 inside the surrounding wall 74. The breather chamber 75 communicates with the valve operating chamber 8 through a communication hole 77 formed through the cam holder 44, and also with a suction system of the engine E or the atmosphere through a ventilation pipe 78 fitted to the head cover 9. In this manner, the breather chamber 75 is defined by utilizing a part of the cam holder 44 and the head cover 9. Therefore, it is unnecessary to provide a special breather chamber body, thereby simplifying the structure of the breather device.

During the operation of the engine E, blowby gas generated in the crankcase 4 passes through the timing gear chamber 51 in flowing to the valve operating chamber 8, and is allowed to flow through the communication hole 77 to the breather chamber 75. Then, the blowby gas is expanded in the breather chamber 75, and is separated from any oil entrained therein prior to being discharged from the ventilation pipe 78. The separated oil is discharged from the communication hole 77 into the valve operating chamber 8.

Figure 9:
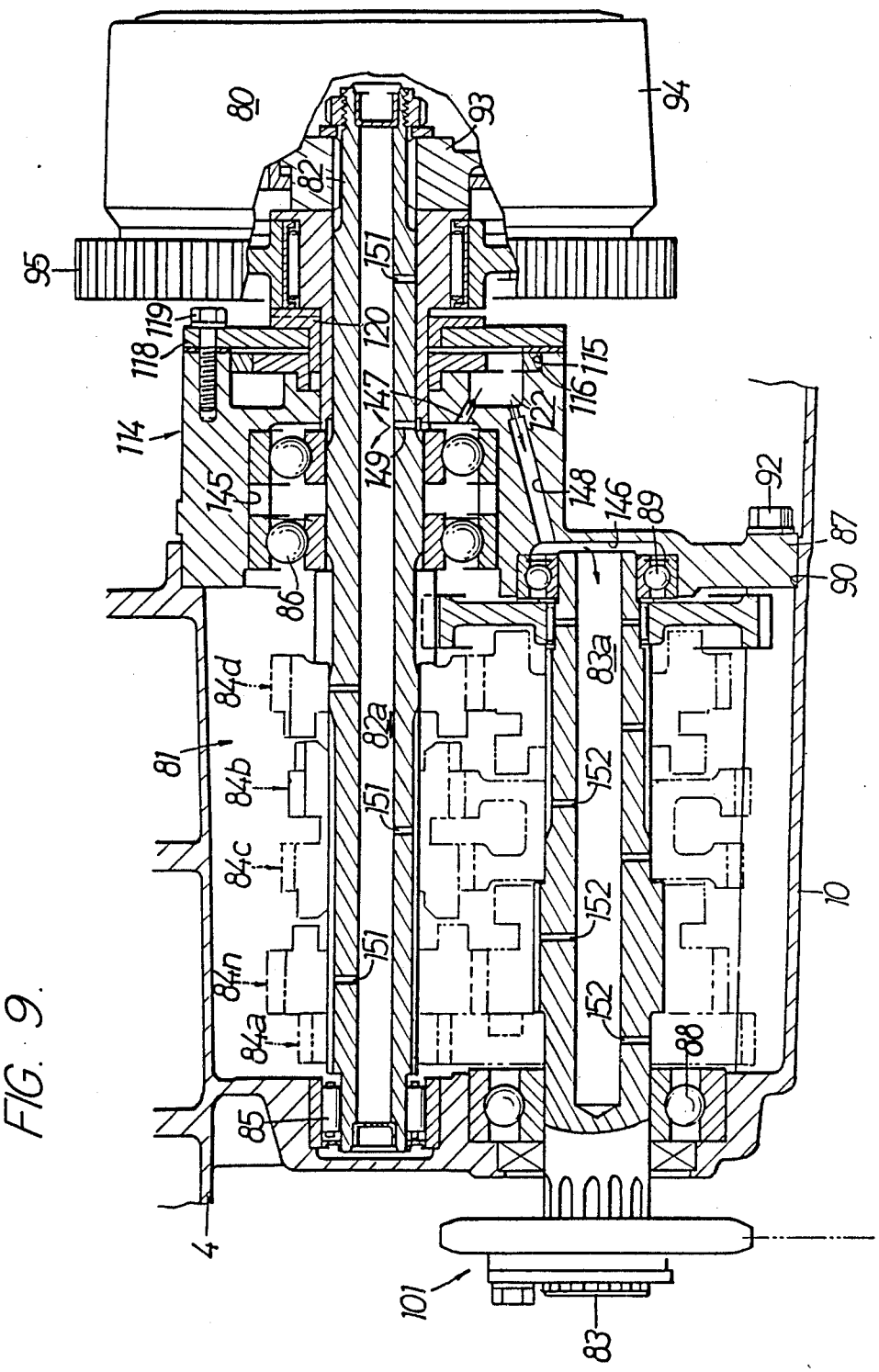
FIG. 9 is an enlarged view of the clutch and transmission shown in FIG. 1.
Figure 10:
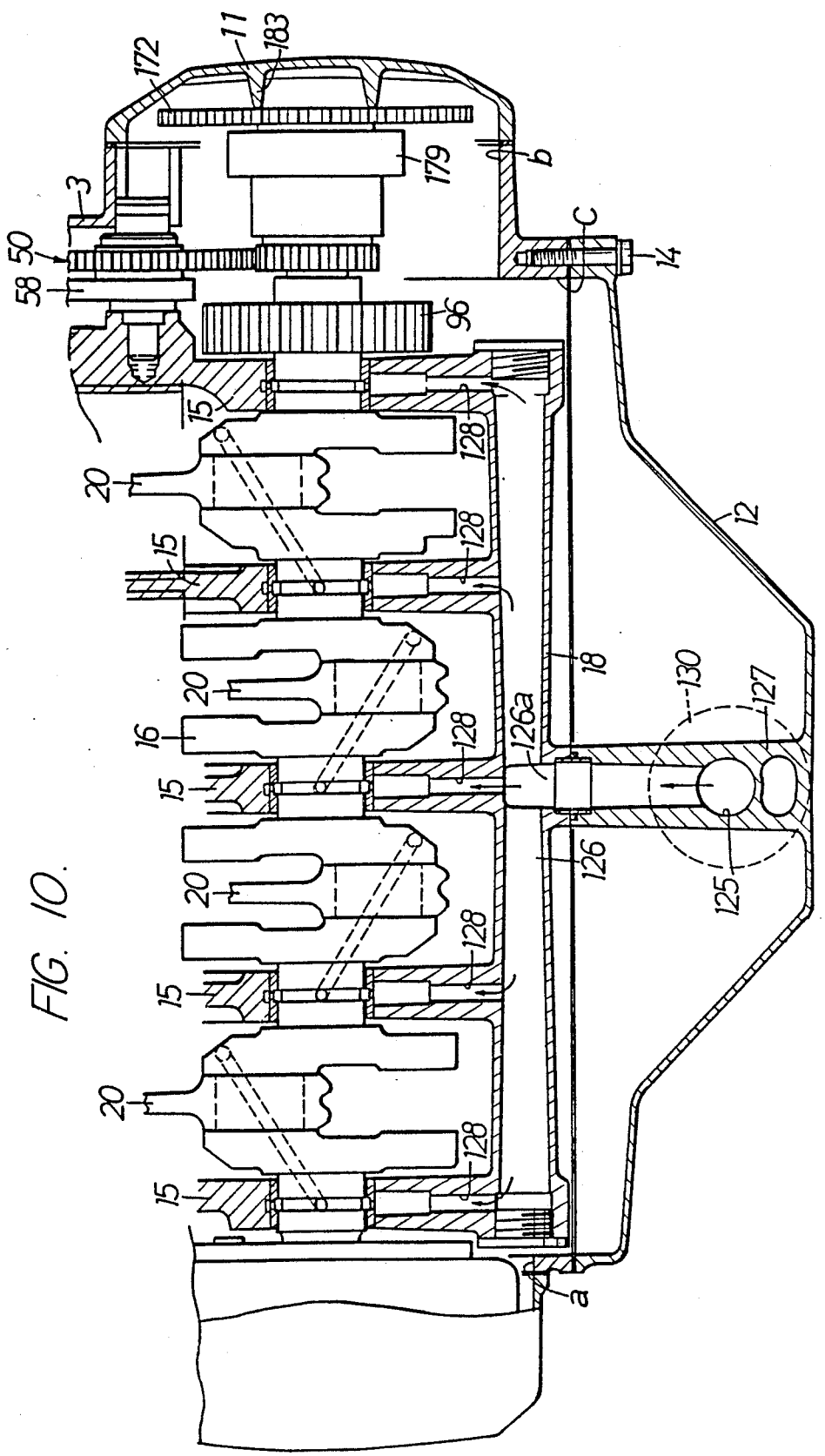
FIGS. 10, 11 and 12 are sectional views taken along lines X—X, XI—XI, and XII—XII of FIG. 3.
Figure 11:
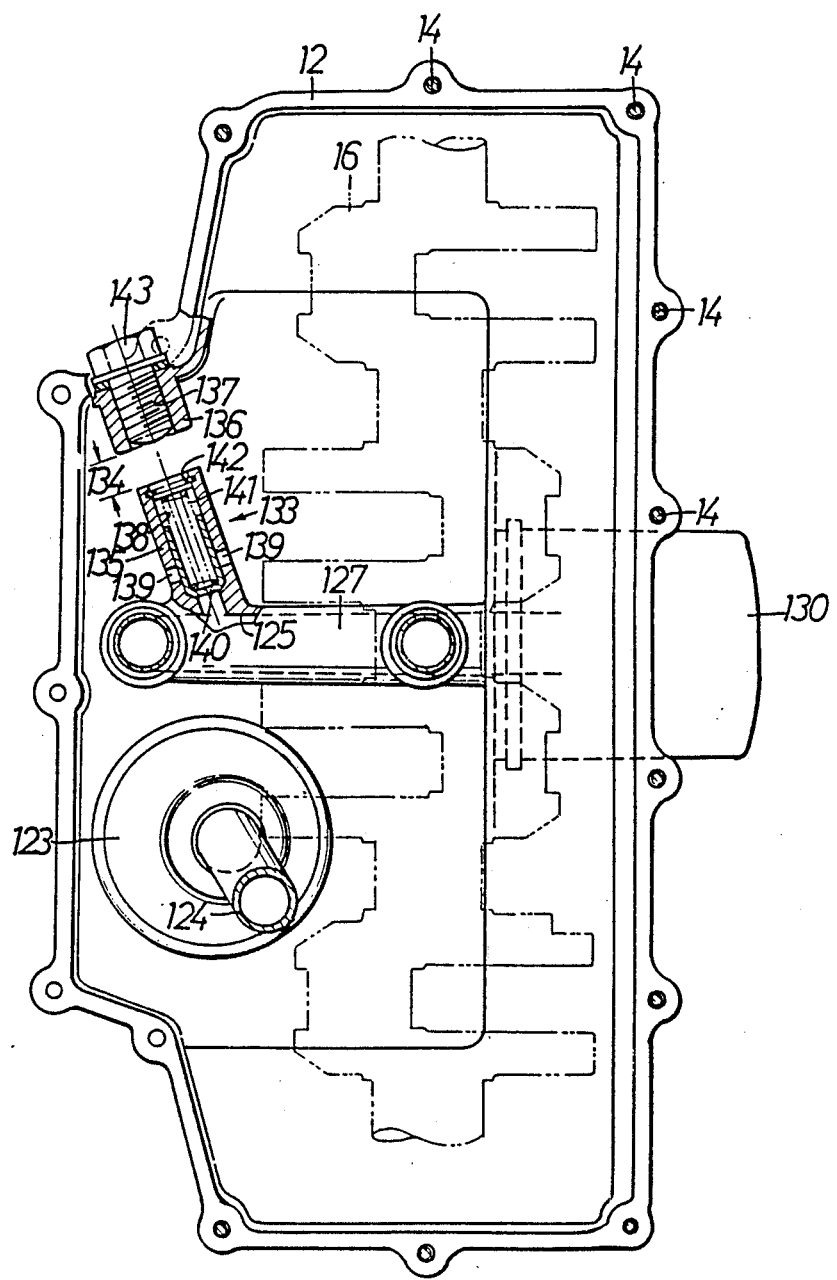
Figure 13:
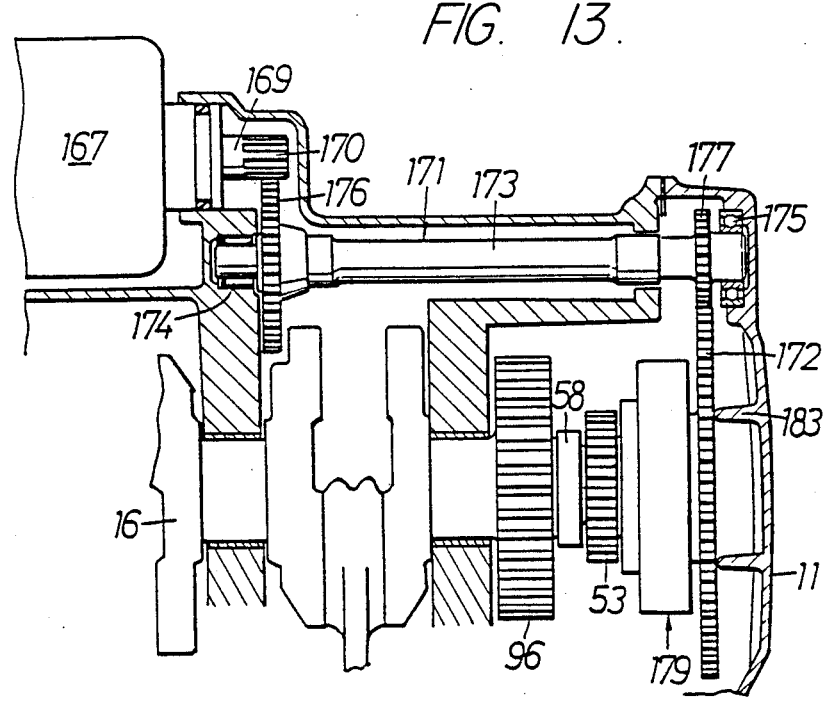
FIG. 13 is a sectional view taken along line XIII—XIII of FIG. 2.

There will now be described the clutch and the transmission. As shown in FIGS. 1 and 9, a clutch 80 and a transmission 81 are accommodated in the transmission case 10. An input shaft 82 and an output shaft 83 of the transmission 81 are arranged in parallel to the crankshaft 16, and multiple speed transmission gear trains $84a$–$84n$ are provided between both the shafts 82 and 83. The input and output shafts 82 and 83 are supported at their left end portions through a needle bearing 85 and a ball bearing 86, respectively, to the left side wall of the transmission case 10, and are supported at their right end portions through ball bearings 88 and 89, respectively, to a partition plate 87 provided at an intermediate portion of the transmission case 10.

The partition plate 87 has a circular shape, and is engaged with an annular shoulder 90 formed on the inner peripheral surface of the transmission case 10. Further, the partition plate 87 is detachably fixed by bolts 92 to a plurality of bosses 91 formed on the peripheral wall of the transmission case 10.

The right end portion of the input shaft 82 extends through the partition plate 87. A clutch inner 93 of the clutch 80 is fixed at the right end of the input shaft 82, while a clutch outer 94 is connected through a primary reduction gear 95 to the crankshaft 16. The primary reduction gear 95 comprises a small-diameter drive gear 96 fixed to the crankshaft 16 and a large-diameter driven gear 97 mounted on one side of the clutch outer 94 through torque damper 98 and meshing with the drive gear 96. The driven gear 97 is supported through a needle bearing 100 on a sleeve 99 mounted on the input shaft 82. Thus, the clutch outer 94 is rotatably supported through the driven gear 97 to the input shaft 82. With this construction, as the transmission 81 may be assembled on the partition plate 87 before fixing the partition plate 87 to the transmission case 10, the ability to assemble the transmission is improved, and its operation can be confirmed before installing it into the transmission case 10.

During operation of the engine E, the output torque of the crankshaft 16 is transmitted through the drive gear 96 and the driven gear 97 to the clutch outer 94. When the clutch 80 is in an engaged condition, torque is transmitted through the clutch inner 93 to the input shaft 82, and is further transmitted through a selected one of the transmission gear trains $84a$–$84n$ to the output shaft 83. The output torque of the output shaft 83 is transmitted through a secondary reduction gear 101 to the rear wheel of the motorcycle to thereby drive the vehicle.

Figure 12:
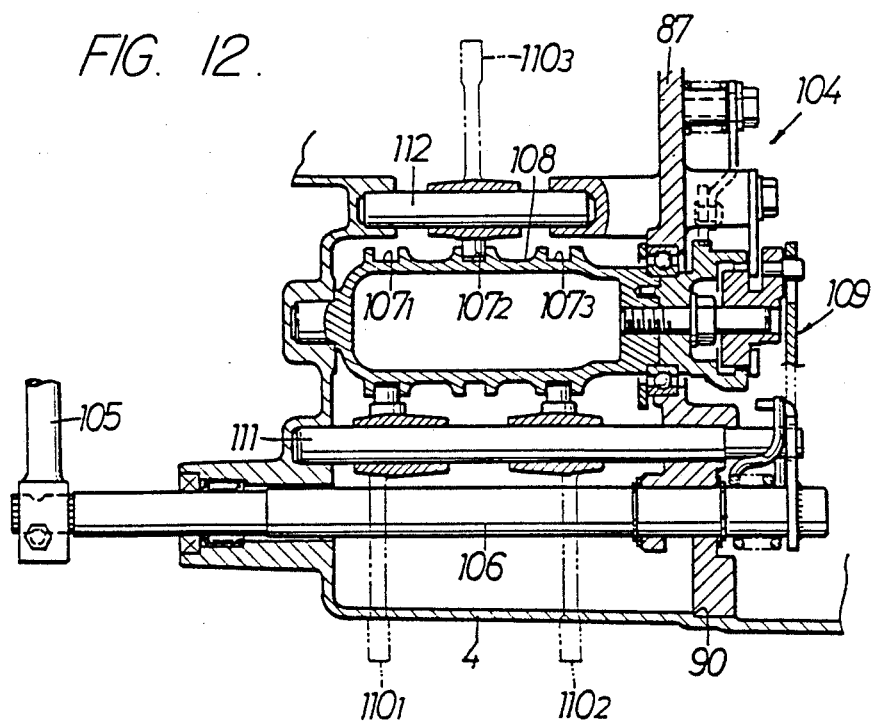

There will now be described the change mechanism for controlling the change operation of the transmission 81. Referring to FIGS. 9 and 12, the change mechanism 104 comprises a change spindle 106 provided with a change pedal 105, as is well known, a shift drum 108 having a plurality of outer peripheral cam grooves $107_1$–$107_3$, a step rotating mechanism 109 for restricting the rotational angle of the change pedal 105 in one operation, and rotating the shift drum 108 at a predetermined angle by the rotation of the change pedal 105, a plurality of shift forks $110_1$–$110_3$ adapted to be engaged at one of their respective ends with the cam grooves $107_1$–$107_3$ and be engaged at the other of their respective ends with a selected one of the transmission gear trains $84a$–$84n$, and fork guide shafts 111 and 112 for slidably supporting the shift forks. The change spindle 106, the shift drum 108 and the fork guide shafts 111 and 112 are arranged in parallel to the input and output shafts 82 and 83 of the transmission 81, and are supported at both ends, respectively, to the partition plate 87 and the left side wall of the crankcase 4. With this construction, as the change mechanism 104 may be assembled on the partition plate 87, together with the transmission 81, before fixing the partition plate 87 to the transmission case 10, the assembly of the apparatus is improved and, moreover, the operation of the change mechanism 104 may be confirmed before installing the same into the transmission case 10.

There will now be described the lubricating device. Referring to FIGS. 1, 3, 9, 10 and 11, a lubricating system of the crankshaft 16 and the valve operating device 31 is constructed in the following manner. A trochoid type oil pump 114 is provided in the partition plate 87. That is, a pump chamber 115 is formed in the partition plate 87 in such a manner as to face the driven gear 97 of the primary reduction gear 95. The pump chamber 115 houses an outer rotor 116 and an inner rotor 117. A cover plate 118 is fixed to the open end of the pump chamber 115 by means of bolts 119. An Oldham's joint 120 is inserted through a central portion of the cover plate 118, and the inner rotor 117 is connected through the Oldham's joint 120 to the driven gear 97. With this arrangement, the oil pump 114 may be continued to be driven through the primary reduction gear 95 during the operation of the engine E. Therefore, it is unnecessary to provide a special driving gear train for driving the oil pump 114 between the crankshaft 16 and the oil pump 114. Further, as the partition plate 87 also serves as a pump case for defining the pump chamber 115, it is unnecessary to provide a special pump case, thereby simplifying the structure.

The partition plate 87 is formed with a suction port 121 and a discharge port 122 both opening to the pump chamber 115. An upstanding suction pipe 124 extends from a strainer 123 located under the oil level in the oil pan 12, and is connected to the suction port 121. The discharge port 122 communicates through an oil passage 125 to an oil gallery 126. The oil passage 125 is formed on an upstanding member 127 extending from the inner wall of the oil pan 12. The oil gallery 126 is integrally formed in the crank holder 18 along the longitudinal direction thereof. It has a central inlet $126a$ connected to the oil passage 125, and a passage area that gradually increases from the inlet $126a$ toward both ends. The oil gallery 126 branches into a plurality of oil supply passages 128 that communicate with bearing surfaces of the respective journals of the crankshaft 16 and a single oil supply passage 129 communicating with a lubricating portion of the valve operating device 31.

In the operation of the oil pump 114, the lubricating oil in the oil pan 12 is pumped through the strainer 123 and fed under pressure through the oil passage 125 to the oil gallery 126. The oil is then distributed to the predetermined parts of the crankshaft 16 and valve operating device 31 to be lubricated.

The lubricating oil in the oil pan 16 is filtered by an oil filter 130 when it passes through the oil passage 125. The oil filter 130 is mounted on the front surface 12a of the oil pan 12, and defines therein a filter chamber through which the oil passage 125 passes. A filter element 131 is provided in the filter chamber. Accordingly, oil flowing in the oil passage 125 is filtered by the filter element 131, and is then fed to the oil gallery 126.

The front surface 12a of the oil pan 12 on which the oil filter 130 is mounted is formed retractedly from the front surface of the crankcase 4. With this structure, the amount of projection of the oil filter 130 from the front surface of the engine E may be reduced.

The oil pan 12 is provided with a relief valve 133 for restricting the upper limit of the discharge pressure of the oil pump 114. That is, the oil pan 12 is formed at its bottom wall with a pair of inner and outer bosses 135 and 136 that are aligned with each other and mutually separated by a predetermined distance 134. The outer boss is formed with a drain hole 137, and the inner boss 135 is bored by utilizing the drain hole 137 to form a valve hole 138 communicated with the oil passage 125. The inner boss 135 is formed with lateral holes 139 communicating the valve hole 138 to the oil pan 12. The valve hole 138 contains a piston-type valve member 140 for opening and closing the lateral holes 139 and a valve spring 141 for biasing the valve member 140 in the valve-closing direction with a predetermined set load. A stop ring 142 for supporting the outer end of the valve spring 141 is engaged with the boss 135. Thusly, the relief valve 133 is constructed.

When the discharge pressure of the oil pump 114 increases to a value greater than the pressure specified by the set load of the valve spring 141, the valve member 140 is caused to retract in receipt of the discharge pressure to open the lateral holes 139. As a result, excessive pressure is discharged from the oil passage 125 through the valve hole 138 to the lateral holes 139.

A drain bolt 143 for closing the drain hole 137 is threadedly engaged with the outer boss 136. In this case, the drain bolt 143 also serves as a blind plug for closing a working hole used for forming the valve hole 138.

The oil stored in the oil pan 12 may be drained from the drain hole 137 by removing the drain bolt 143. The drainage of the oil through the drain hole 137 is not at all hindered due to the space provided between the bosses 135 and 136 as mentioned above.

There will now be described a lubricating system for the transmission 81 with reference to FIG. 9. The partition plate 87 is formed with a first orifice 147 connecting the discharge port 122 of the pump chamber 115 with a bearing housing 145 retaining the ball bearing 88 of the input shaft 82, and also with a second orifice 148 communicating the discharge port 122 with a bearing housing 146 retaining the ball bearing 89 of the output shaft 83. The input shaft 82 is formed with a hollow portion 82 that is closed at both ends thereof. It is further formed with an oil inlet hole 149 communicating the hollow portion 82a with the bearing housing 145, and with a plurality of oil supply holes 151 communicating the hollow portion 82a with the sliding surfaces and rotating surfaces of the transmission gears on the input shaft 82. Similarly, the output shaft 83 is formed with a hollow portion 83a opening at one end to the bearing housing 146. Shaft 83 is also provided with a plurality of oil supply holes 152 communicating the hollow portion 83a with the sliding surfaces and rotating surfaces of the transmission gears on the output shaft 83.

During the operation of the oil pump 114, oil to be discharged from the discharge port 122 is partially metered by first and second orifices 147 and 148, and is fed to the bearing housings 145 and 146. Then, the oil is introduced into the hollow portions 82a and 83a of the input and output shafts 82 and 83, respectively, and distributed to the respective oil supply holes 151 and 152, thus lubricating the respective portions of the transmission gear trains 84a–84n.

With this construction of the lubricating system for the transmission 81, the oil passages connecting the oil pump 114 with the hollow portions 82a and 83a of the input and output shafts 82 and 83 are simplified to thereby reliably supply oil to the transmission 81.

There will now be described the starting device. Referring to FIGS. 1 to 3 and 13, a starter motor 167 is located at a transverse central portion in a trough 168 formed between the rear surface of the cylinder block 3 and the upper surface of the crankcase 4. The trough 168 is disposed in such manner as to be parallel to the crankshaft in consideration of the transverse weight balance of the engine E. A rotor shaft 149 of the starter motor 167 projects at its right end portion, that is, at the end on the timing gear chamber 50 side. The right end portion of the rotor shaft 169 is formed with a pinion 170. The pinion 170 is connected through an intermediate gear shaft 171 to a ring gear 172 mounted on the right end portion of the crankshaft 16. The intermediate gear shaft 171 comprises a rotating shaft 173 supported through a pair of left and right bearings 174 and 175 to the crankcase 4 and the side cover 11, respectively, a large-diameter gear 176 fixed at a left end portion of the rotating shaft 173 and meshing with the pinion 170, and a small-diameter gear 177 fixed at the right end of the rotating shaft 173 and meshing with the ring gear 172. Thus, rotation of the pinion 170 may be transmitted to the ring gear 172 with a two-step reduction of speed. By adopting the intermediate gear shaft 171, as mentioned above, the ring gear 172 may be reduced in diameter, and the engine E may thereby be made more compact.

Figure 1A:
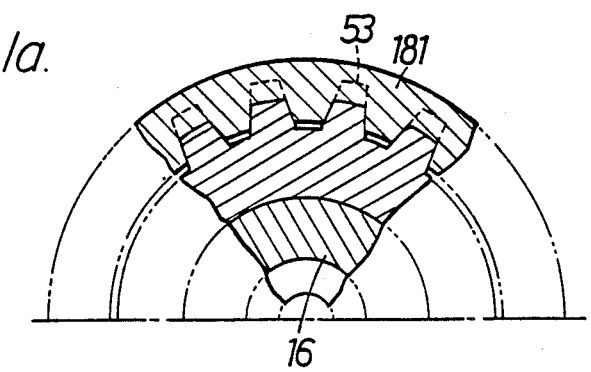
FIG. 1A is a sectional view taken along line IA—IA of FIG. 1.

As shown in FIG. 1, the ring gear 172 is rotatably supported through a bush 178 on the crankshaft 16, and connected to the crankshaft 16 through an overrunning clutch 179. The overrunning clutch 179 comprises a clutch inner 180 also serving as a boss of the ring gear 172, a clutch outer 181 that is releasably lightly press-fit through a spline to the drive gear 53 of the timing gear 50 (see FIG. 1A) and surrounding the clutch inner 170, and a clutch roller 182 interposed between the clutch inner 180 and the clutch outer 181. Thus, a driving force is transmitted in one direction from the clutch inner 180 to the clutch outer 181. Accordingly, when the starter motor 167 is operated so as to start the engine E, the rotation of the rotor shaft 169 of the starter motor 167 is transmitted through the intermediate gear shaft 171 to the ring gear 172 with a two-step reduction of speed as mentioned above, and is further transmitted through the overrunning clutch 179 to the crankshaft 16, thus cranking the crankshaft 16. After starting the engine E, when the rotational speed of the clutch outer 181 of the overrunning clutch 179 becomes greater than that of the clutch inner 180, the clutch 179 is disengaged to thereby prevent overrunning of the starter motor 167.

A stopper 183 projects from the inner wall of the side cover 11 and abuts against the outer side surface of the ring gear 172, thus to prevent the ring gear 172 from being disengaged from the crankshaft 16. With this construction, as the side cover 11 functions to prevent the disengagement of the ring gear 172, it is unnecessary to provide a special, dedicated member for preventing disengagement of the ring gear 172 from the crankshaft 16, thereby simplifying the structure. Moreover, while the engine E is being operated, the ring gear 172 is maintained in a stopped condition. Accordingly there is no possibility of wear being generated at the contacting portions between the ring gear 172 and the stopper 183. Also, if the side cover 11 is removed, the ring gear 172 can be readily removed from the crankshaft 16.

Figure 15:
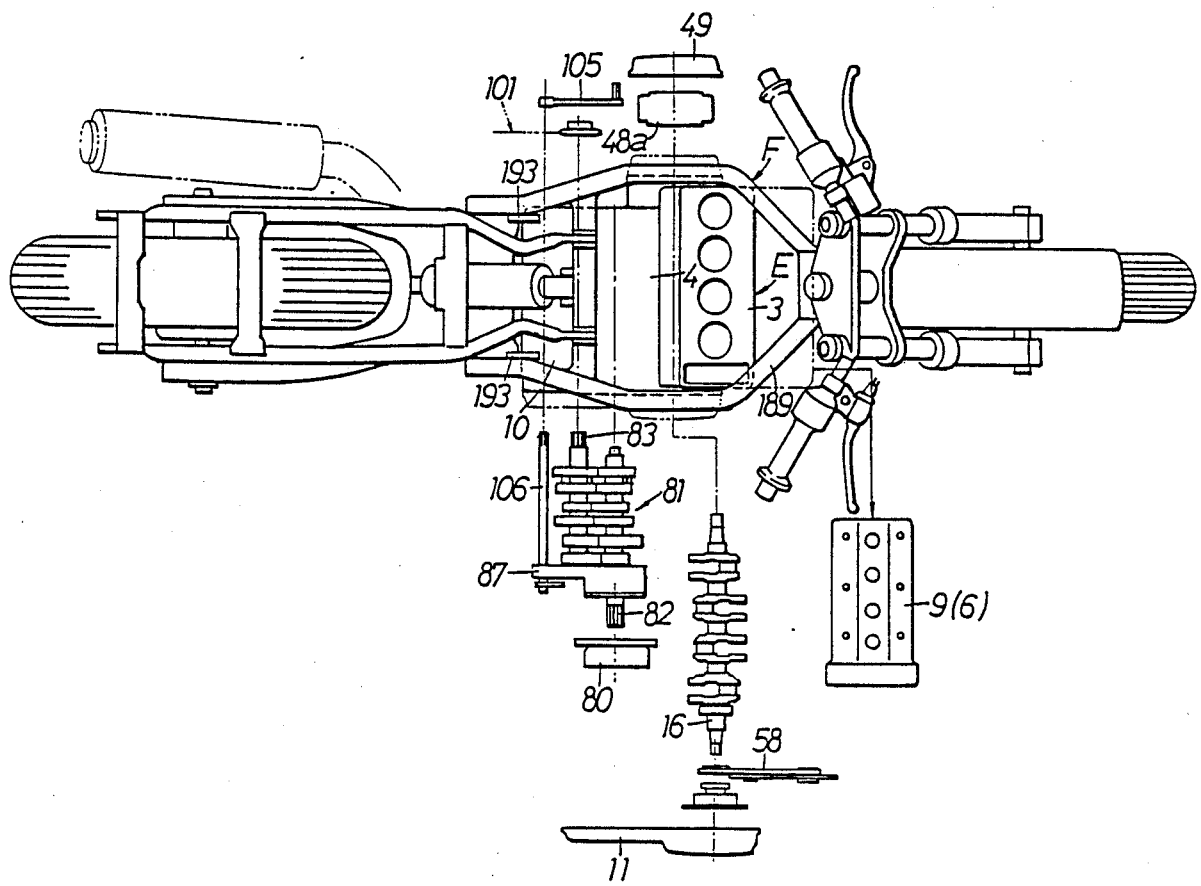
FIG. 15 is an exploded view of the engine organization and vehicle of FIG. 14.

Finally, there will be described a mount structure of the engine E to the motorcycle. Referring to FIGS. 2, 14 and 15, the integrated assembly of the crankcase 4 and the transmission case 10 in which the engine E is installed is integrally formed at its front portion with a pair of right and left front hangers 185. It is also integrally formed at its rear portion with a pair of right and left upper hangers 186 and a pair of right and left lower hangers 187.

On the other hand, the body frame F of the motorcycle has a pair of right and left rearwardly downwardly inclined main frames 189 on which the fuel tank 188 is mounted. The main frames 189 are formed with a pair of right and left front brackets 190 and a pair of right and left rear brackets 191 in such manner as to extend downwardly therefrom. The front hangers 185 of the engine E are fixed by bolts 192 to the front brackets 190, while the rear upper hangers 186 are fixed by bolts 193 to upper portions of the rear brackets 191 and the rear lower hangers 189 are fixed by bolts 194 to lower portions of the rear brackets 191. Thusly, the engine E is mounted on the vehicle body frame F.

By incorporating this mount structure in the structure of the engine E, the crankshaft 16 may be downwardly demounted from the engine E with the pistons 19 and the connecting rods 20 being retained in the cylinder block 3 by opening both the side covers 11 and 49 and the oil pan 12 and downwardly removing the crank holder 18 under the condition that the assembly of the crankcase 4 and the transmission case 10 is supported to the vehicle body frame F. Further, the transmission 81 and the change mechanism 104 may also be readily demounted, together with the partition plate 87, by removing, first, the secondary reduction gear 101 from the output shaft 83 of the transmission 81, then the change pedal 105 from the change spindle 106, and thereafter removing the partition plate 87 sidewardly from the transmission case 10.

Further, the cylinder head 6 may be demounted sidewardly from between the front brackets 190 and the front fork 195 of the vehicle by removing the head cover 9 and then disconnecting the cylinder head 6 from the cylinder block 3.

As mentioned above, each component of the engine E may be mounted and demounted without removing the whole of the engine from the body frame F. As a result, maintenance of the engine may be carried out much more easily and quickly.

Figure 16:
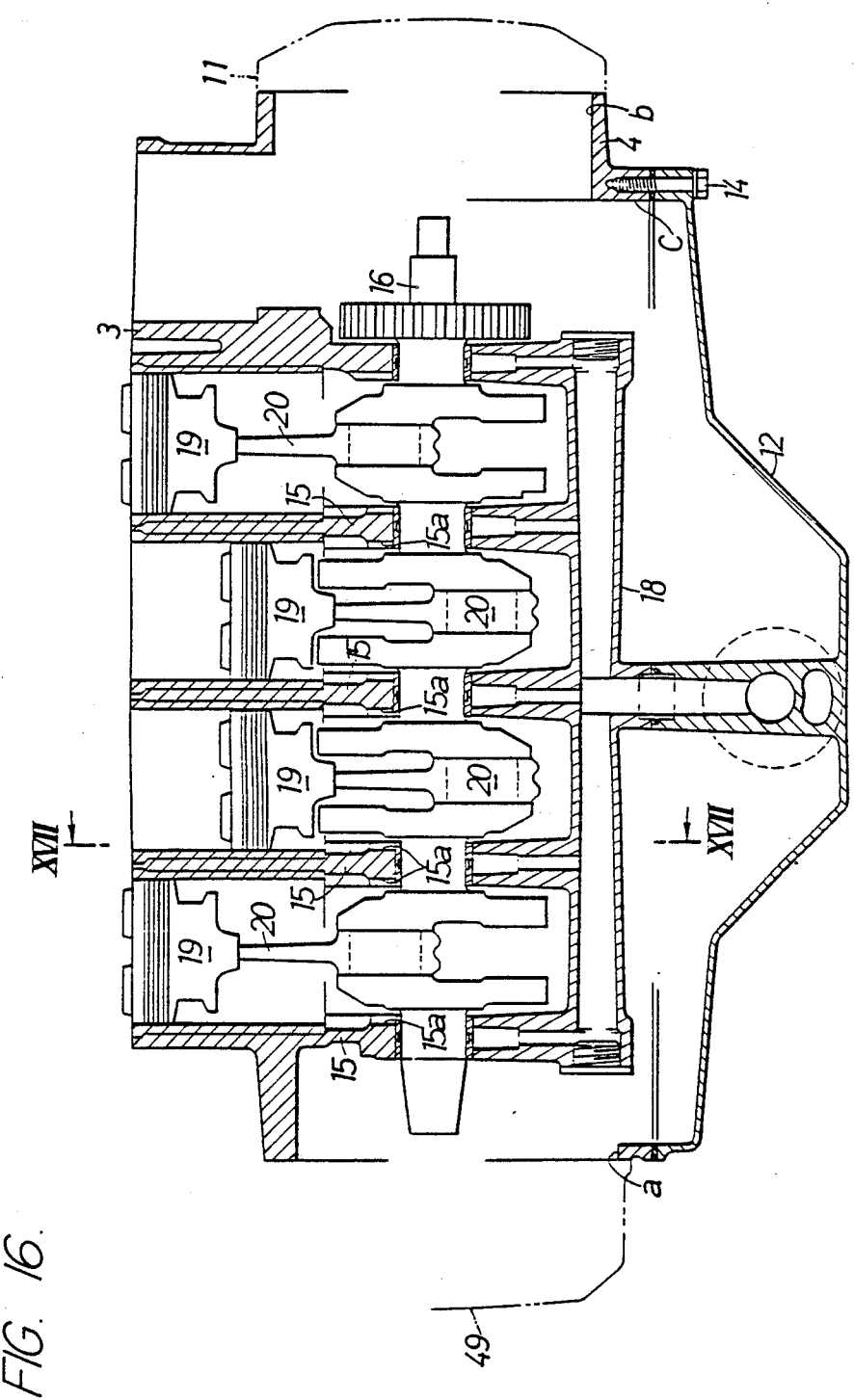
FIG. 16 is a sectional view similar to FIG. 10 illustrating a second embodiment of the present invention.
Figure 17:
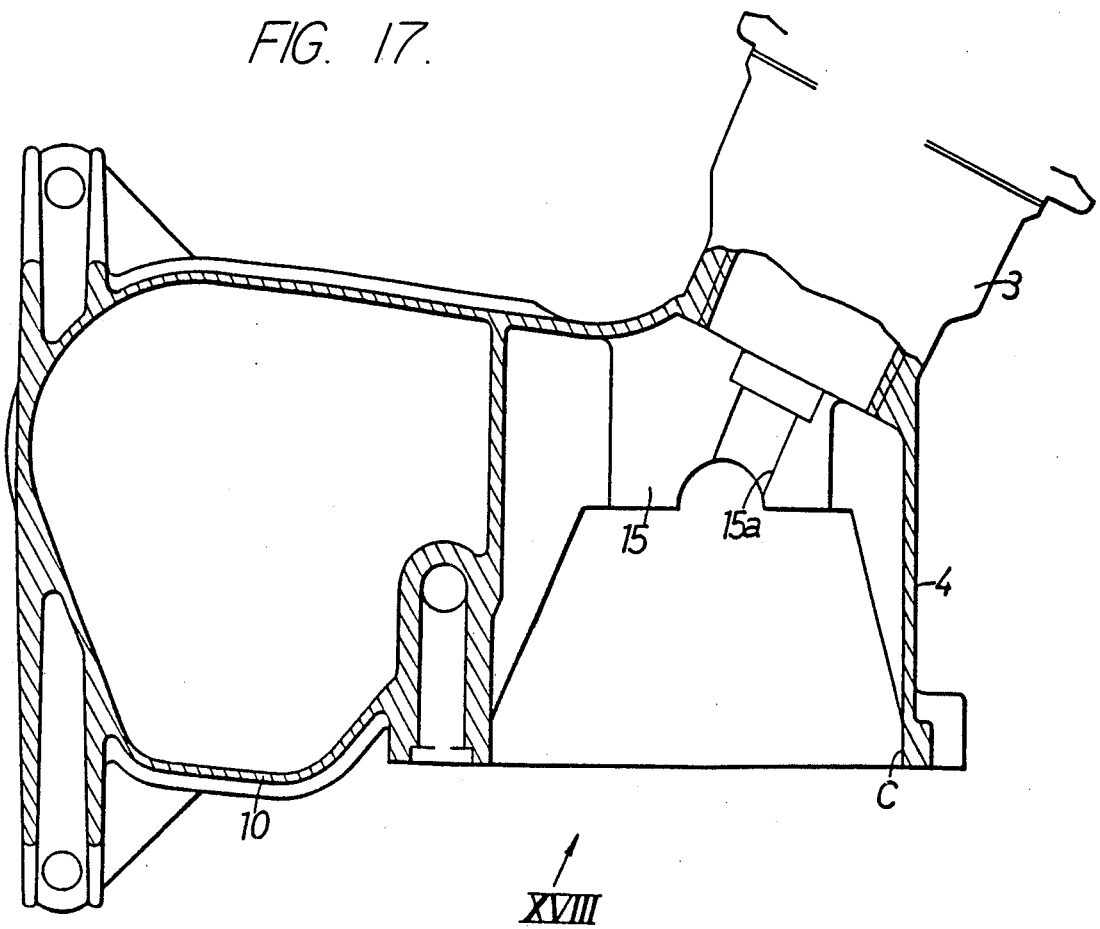
FIG. 17 is a sectional view taken along line XVII—XVII of FIG. 16.
Figure 18:
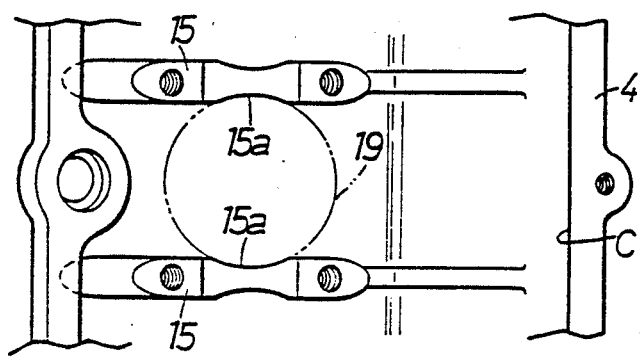
FIG. 18 is a view taken along arrow XVIII of FIG. 17.

FIGS. 16 to 18 showed an alternative embodiment of the present invention. In this embodiment, the transverse width of the lower opening c of the crankcase 4 is just slightly greater than the entire length of the crankshaft 16, and the opposite surfaces of the adjacent crank journal supporting walls 15 are formed with sectionally arcuate recesses 15a permitting the passage of the pistons 19. The remainder of the construction is substantially similar to that of the first preferred embodiment, and the parts corresponding to those in the first preferred embodiment are designated by the same reference numerals.

According to the second preferred embodiment, in removing the crankshaft 16 from the crankcase 4 through the lower opening c, the connecting rods 20 and the pistons 19 may be removed together with the crankshaft 16. Accordingly, maintenance of the engine E may be easily carried out.

It should be further understood that, although preferred embodiments of the invention have been illustrated and described herein, changes and modifications can be made in the described arrangement without departing from the scope of the appended claims.

We claim:

1. A vehicle engine including walls forming a housing structure defining an integrally formed cylinder block, crankcase and transmission case, mounting means in said crankcase for rotatably mounting a crankshaft, a transmission rotatably mounted in said transmission case, said transmission case being transversely disposed with respect to said crankcase and means forming a first closable opening in a wall of said crankcase below said crankshaft sized to permit installation and withdrawal of said crankshaft from said crankcase and means forming a second closable opening in a wall of said transmission case separate from said crankcase wall sized to permit installation and withdrawal of said transmission from said transmission case.

2. The vehicle engine according to claim 1 in which said housing structure includes an oil pan, and means for detachably connecting said oil pan about said crankcase opening below said crankshaft.

3. The vehicle engine according to claim 1 including side wall openings in said crankcase at oppositely spaced ends of said crankshaft mounting means, and detachable side wall covers closing said side wall openings, a head cover over said cylinder block, a camshaft rotatably mounted in said head cover, a gear train including an idler gear pin-connected for rotation to said housing structure, the connecting pin for said idler gear being disposed adjacent said side wall opening and accessible for release upon detachment of said side wall cover covering said side wall opening.

4. The vehicle engine according to claim 8 including mounting hangers formed on said housing structure.

5. The vehicle engine according to claim 1 including side wall openings in said crankcase at oppositely spaced ends of said crankshaft mounting means, and detachable side wall covers closing said side wall openings, a starting device including a ring gear supported for rotation on one end of said crankshaft, a starter motor engageable with said ring gear and clutch gear for connecting said ring gear to said crankshaft, and means on one of said crankcase side wall covers engageable with said ring gear for preventing axial disengagement of said ring gear from said crankshaft.

6. A vehicle engine according to claim 1 in which said transmission case wall containing said second opening is angularly displaced from said crankcase wall containing said first opening.

7. A vehicle engine according to claim 1 in which said transmission case wall containing said second opening is an end wall and said second opening is disposed in the wall of said crankcase beneath said crankshaft.

8. A vehicle engine according to claim 1 including a plurality of pistons each being operatively connected to said crankshaft by a connecting rod, and said crankshaft mounting means including openings for passage of said connecting rods and pistons with removal of said crankshaft.

* * * * *

UNITED STATES PATENT AND TRADEMARK OFFICE
CERTIFICATE OF CORRECTION

PATENT NO. : 4,920,825

DATED : May 1, 1990

INVENTOR(S) : Kouji OKAZAKI et al.

It is certified that error appears in the above-identified patent and that said Letters Patent is hereby corrected as shown below:

In claim 4 (column 12, line 54) delete "8" and insert therefor -- 1 --.

Signed and Sealed this

Fifteenth Day of October, 1991

Attest:

HARRY F. MANBECK, JR.

*Attesting Officer*    *Commissioner of Patents and Trademarks*